United States Patent [19]
Andersson et al.

[11] Patent Number: 5,844,322
[45] Date of Patent: Dec. 1, 1998

[54] LOW ENERGY FUSE AND METHOD FOR ITS MANUFACTURE

[75] Inventors: Lars Andersson; Karl-Erik Danertz; Göran Jidestig, all of Nora, Sweden

[73] Assignee: Nitro Nobel AB, Nora, Sweden

[21] Appl. No.: 786,655

[22] Filed: Jan. 21, 1997

Related U.S. Application Data

[62] Division of Ser. No. 436,277, filed as PCT/SE93/00954, Nov. 10, 1993, published as WO94/11324, May 26, 1994, Pat. No. 5,629,493.

[30] Foreign Application Priority Data

Nov. 17, 1992 [SE] Sweden .................................. 9203459

[51] Int. Cl.$^6$ ............................... C06B 21/00; F42B 3/00
[52] U.S. Cl. ........................... 264/3.3; 86/20.15; 102/332
[58] Field of Search ........................... 234/3.3; 86/20.15; 102/275.8, 275.9, 332

[56] References Cited

U.S. PATENT DOCUMENTS

| | | | |
|---|---|---|---|
| 3,590,739 | 7/1971 | Persson | 102/275.8 |
| 4,232,606 | 11/1980 | Yunan | 102/27 R |
| 4,244,900 | 1/1981 | Heider | 102/275.8 |
| 4,290,366 | 9/1981 | Janoski | 102/202.3 |
| 4,328,753 | 5/1982 | Kristensen et al. | 102/275.5 |
| 4,493,261 | 1/1985 | Simon et al. | 102/331 |
| 4,607,573 | 8/1986 | Thureson et al. | 102/275.8 |
| 4,660,474 | 4/1987 | Santos | 102/275.8 |
| 4,756,250 | 7/1988 | Santos | 102/275.1 |
| 4,817,673 | 4/1989 | Zoghby et al. | 138/174 |
| 4,838,165 | 6/1989 | Gladden et al. | 102/275.8 |
| 4,987,818 | 1/1991 | Alford | 86/1.1 |
| 5,024,159 | 6/1991 | Walley | 102/289 |
| 5,069,132 | 12/1991 | Kakino et al. | 102/331 |
| 5,166,470 | 11/1992 | Stewart | 102/275.5 |
| 5,208,419 | 5/1993 | Greenhorn et al. | 102/275.4 |
| 5,317,974 | 6/1994 | Stewart et al. | 102/275.8 |
| 5,509,355 | 4/1996 | Stewart et al. | 102/275.8 |
| 5,597,973 | 1/1997 | Gladden et al. | 102/275.9 |

FOREIGN PATENT DOCUMENTS

| | | |
|---|---|---|
| 1200718 | 2/1986 | Canada . |
| 0 384 630 | 8/1990 | European Pat. Off. . |
| 0 327 219 | 2/1993 | European Pat. Off. . |
| 864170 | 4/1988 | Finland . |
| WO 90/0244 | 4/1988 | Finland . |
| WO 87/03954 | 7/1987 | WIPO . |

OTHER PUBLICATIONS

English translation of opposition document filed on behalf to TEC Harseim S.A.I.C. in the Chilean Patent Office.
English translation of opposition document filed on behalf of The Ensign Bickford Co. in the Chilean Patent Office.
English translation of pp. 14 and 15 of a Technical Manual edited by DENASA.
Encyclopedia of Polymer Science and Engineering, 1988, vol. 14, pp. 542, 564–576, by H F Mark et al.

*Primary Examiner*—Peter A. Nelson
*Attorney, Agent, or Firm*—Burns, Doane, Sweck & Mathis, L.L.P.

[57] ABSTRACT

A low energy fuse, comprising a plastic tube with a channel, the channel containing a reactive material able upon ignition to sustain a shock wave within the channel, the tube comprising at least two layers of plastic materials, a first plastic layer closer to the channel and a second plastic layer outside the first layer, at least the second layer containing a major amount of draw orientable polymer resin. The polymer in the second layer is axially oriented to an orientation degree (as defined) of more than 25% and less than 90% and that the polymer of the first layer has an axial orientation degree not exceeding 10% orientation degree units more than that of the second layer. The tube can be manufactured by a) forming, by extrusion of the first layer plastic, the first layer in the form of a tube, b) introducing the reactive material in the tube channel, c) limiting stretching of the first layer to give a low degree of orientation, not exceeding 10% (as defined), d) forming, by extrusion of the second layer plastic, the second layer around the first tube, while the first layer have said low degree of orientation, and e) cold-stretching the first and second layers together.

37 Claims, 4 Drawing Sheets

LOW ENERGY FUSE AND METHOD FOR ITS MANUFACTURE

This application is a divisional of application Ser. No. 08/436,277, filed Jun. 21, 1995 now U.S. Pat. No. 5,629,493, which corresponds to PCT/SE93/00954, filed Nov. 10, 1993, published as WO94/11324 May 26, 1994.

TECHNICAL FIELD

The present invention relates to a low energy fuse, comprising a plastic tube with a channel, the channel containing a reactive material able upon ignition to sustain a shock wave within the channel, the tube comprising at least two layers of plastic materials, a first plastic layer closer to the channel and a second plastic layer outside the first layer, at least the second layer containing a major amount of draw orientable polymer resin. The invention also relates to a manufacturing method for such a fuse and the fuse manufactured by the method.

BACKGROUND

A low energy fuse of the type referred to was first described in U.S. Pat. No. 3,540,739 and numerous subsequent patents have been published. In broad terms the fuse consists of a narrow plasic tube with a pyrotechnic or self-explosive reactive matter disposed within the tube channel. The amount of reactive material is sufficient to give a high speed shock wave in the channel, able to ignite secondary or functional pyrotechnical devices such as detonators or transmission caps for blasting networks. Yet the amount of reactive material is sufficiently small to confine the reaction within the tube without destroying, disrupting or even deforming it and to make the overall device safe, harmless and noiseless in use.

Although the device is simple in principle, the physical demands placed on it are not. A substantial radial strength is needed to resist the forces produced by the shock. Signal speed is lost, or the wave halted, if the tube is substantially defomed or ruptured. Radial strength is also needed to avoid compression and external damages and to allow crimp attachment of functional devices to the tube. Substantial axial strength with maintained elasticity is needed to take up forces involved in handling, network connection and charging operations. Overall thoughness is needed to sustain the harsh field conditions before and during blasting. Further desired properties are suitable friction properties and impermeability to moisture and oil.

The reactive material is typically a powder introduced in the channel. For that reason a unique constraint on the fuse tube is that the interior surface must have suitable powder adhesion properties. A too weak attraction may mobilize the powder, giving signal interuptions due to material rarefactions or clogs. Too stong bonds counteracts rapid reaction and dust explosion.

The fuse tube is produced in considerable lengths and the tube materials must be inexpensive and the manufacturing methods cost effective.

The demands are partly contradictory and single-layered tubes tend to require a compromise between desired properties.

It has been suggested in U.S. Pat. No. 4,328,753 to make a two-layer tube and select inner and outer materials of different properties but the materials are not optimally used solely thereby.

It has been suggested, in for example Canadian patent 1 200 718 and U.S. Pat. No. 4,817,673 to increase axial strength by incorporating longitudinal reinforcing filaments in the tube material. The resulting inelastic tube is unable to absorb elongation under field conditions and tend to break or disengage from its detonator when subjected to strain. The tube material is not efficiently utilized in spite of the increased costs for manufacture and reinforcements.

The U.S. Pat. No. 4,607,573 descibes a manufacturing method in which an inner tube with suitable adhesive properties is first manufactured and then elongated under overextrusion to increase manufacturing speed, minimize the amount of adhesive inner material and give an orientation to the elongated tube material. The respective materials are not efficiently used as orientation is concentrated to the inner layer, resulting in radial brittleness, whereas the outer layer contributes little to axial strength. A product inclined to fracture will result unless stretching is limited.

The European patent specification 327 219 describes a single-layer tube extruded from a mixture of a draw orientable polymer and a minor amount of a polymer of adhesive quality. In manufacture the adhesive polymer is said to concentrate at the inner surface of the tube and substantial orientation of the polymers is imposed in a cold stretching step following extrusion. The orientation adds substantial axial strength to the tube but the radial strength is lost proportionally, again resulting in a poor resistance to the shock and a poor utilization of the inherent strength capacities of the polymers used.

These more advanced tube designs add to production costs and problems. Simple coextrusion or overextrusion can be done fairly easily but do not utilize the full strength of the materials. Orientation by substantial stretching can be run efficiently but tend to give unacceptable radial properties. Limited stretching may be preferred but tends to give unstable process conditions and final tube properties unless the draw orientable polymer is supported by other layers or conditions.

THE INVENTION GENERALLY

A main object of the present invention is to avoid the problems of hitherto used fuse tubes. A more specific object is to provide a fuse tube of two or more layers with optimized utilization of material strength properies. Another object is to provide a fuse tube having suitable strenght properties both axially and radially. Yet another object is to provide a fuse tube having an inner layer giving a major contribution to radial strength and an outer layer giving a major contribution to axial strength. Still another object is to provide a multiple layer tube further improved properties in the above respects. A further object of the invention is to provide a suitable manufacturing method for the fuse tube, giving the desired properties. A further object is to provide a tube manufacturing method avoiding problems with desired process parameters.

These objects are reached with the characteristics set forth in the appended claims.

According to the invention a low energy fuse tube, of the type first said herein, is provided in which the polymer in the second layer is axially oriented to between 20 and 90% of its available orientation (as defined) and that the polymer of the first layer has an axial orientation not more than 10% more than that of the second layer.

The axial orientation of the second layer polymer gives improved axial strength to the tube. The orientation is limited in order to maintain an axial elastic and plastic elongation capability of the tube to meet the abovesaid fabrication and field condition requirements. The orientation is also limited in order to retain a significant radial strength contribution to the tube and to avoid brittleness. The orientation of the first layer polymer is at most substantially the same as in the second layer. To the extent it is in any way higher it is only due to unavoidable elongation in certain manufacturing alternatives. Preferably the first layer orientation is lower than that of the second layer, especially at higher orientation degrees in the second layer. The low orientation degree of the first layer contributes to radial strength of the tube. Above all the layer hereby maintains non-brittle properties in the first layer itself both radially and axially, which has been found optimal for tube resistance to the shock wave forces. Without being bound by theory it is believed that observed lack of tube resistance to shock wave is due to notch weaknesses, caused by the sudden shock wave on a polymer layer brittled in any direction by stretch orientation, and being especially fatal when crack formations are easily initiated in the inner layer. The present suggestion maintains first layer toughness in both radial and axial directions. Radial properties are directly significant for shock expansion forces, but also axial crack tendencies are important among others since tube failures are mainly found at kinks and folds on the tube. The low inner layer orientation is complemented by the outer layer being chiefly responsible for tube overall axial strength. The low inner layer orientation is also consistent with the requirement for good adhesion properties at the tube channel. According to preferred embodiments of the invention the tube may comprise further layers, amplifying the abovesaid basic properties or adding beneficial secondary properties to the tube.

The invention also relates to a method for manufacture of the abovesaid tube, comprising the steps of a) forming, by extrusion of the first layer plastic, the first layer in the form of a tube, b) introducing the reactive material in the tube channel, c) limiting stretching of the first layer to give a low degree of orientation, not exceeding 10% (as defined), d) forming, by extrusion of the second layer plastic, the second layer around the first tube, while the first layer have said low degree of orientation, and e) cold-stretching the first and second layers together, preferably to a limited degree of oientation in the layers.

The final cold stretching step provides the desired orientation of at least the second layer for improved axial tube strength. The limited stretching degree gives maintained elongation properties to the tube as well as a radial strength contribution from the first layer. By limiting stretching of the first layer before and during application of the second layer the first layer will not be overly oriented in the last stretching step but will have retained non-brittle properties both radially and axially. Stretching the layers together assures that the first layer orientation will not exceed that of the second layer and further serves to facilitate the stretching operation itself as different material properties of the layers tend to smooth out irregularities and instabilities. Additional steps in the method may be used to further limit final orientation in the first layer and concentrate orientation to the second layer. The method may include a further step wherein one or more additional layers are provided, before or after the stretching operation, in order to achive the additional advantages outlined. The method can generally be implemented in co-extrusion, over-extrusion and tandem extrusion process layouts.

Further objects and advantages with the invention will be evident from the detailed description hereinbelow.

DEFINITIONS

By "stretch ratio" shall be understood the weight to weight ratio of equal lengths of tube before and after stretching respectively. The measure is substantially similar to the length ratio of the same part of tube after and before stretching, but also includes the density change.

"Cold-stretching" refers to stretching under conditions resulting in substantial molecular orientation in draw orientable polymers. The conditions may require a temperature below the solidification temperature for the polymer, as opposed to warm-stretching that allows for substantial molecular relaxation simultaneous with the stretching. Unless otherwise indicated, second layer conditions are referred to as the invention aims at a concentration of orientation to this layer.

"Plastic" refers to the total material composition used for a layer. It includes a main part of one or more "polymers, providing layer strength and generally able to accept orientation, as well as any additive other than the polymers.

"Co-extrusion" refers to the process of substantially simultaneous formation of at least two layers, normally by extrusion of the melts from different orifices on the same die head. "Over-extrusion refers to the process of first forming a layer in sufficient consolidated form for allowing the extrudate to be fed through a second extruder in which a second layer is applied. "Tandem extrusion" refers to an over-extrusion process in-line with the first extrusion, without intermediate storage of the first formed extrudate.

"Fold test" refers to a method for determination of the the fuse tube tendency to rupture under the influence of the shock at folds provided on the tube. On a continuous length of the tube to be tested a number of folds are provided with a minimum length of 50 cm tube between the folds. The folds are fixed in place by insertion into circular holes drilled in a plate to a depth of about 3 cm and with a diameter of about 65% larger than the double diameter of the tube (or about 8 mm for 3 mm tubes). After tube initiation the folds are inspected for any kind of wall rupture and the result is given as the quotient between the number of folds with rupture to the total number of folds.

"Orientation degree" refers to a value on the orientation in the axial direction of the fuse tube and is expressed in percent, zero percent representing no orientation or random orientation and one hundred percent representing maximum possible orientation for the polymer under consideration. To establish an actual sample value between these extremes different methods may be employed. The methods suggested herein are either based on "yield strength" or "IR-spectrometry".

Figure 4:
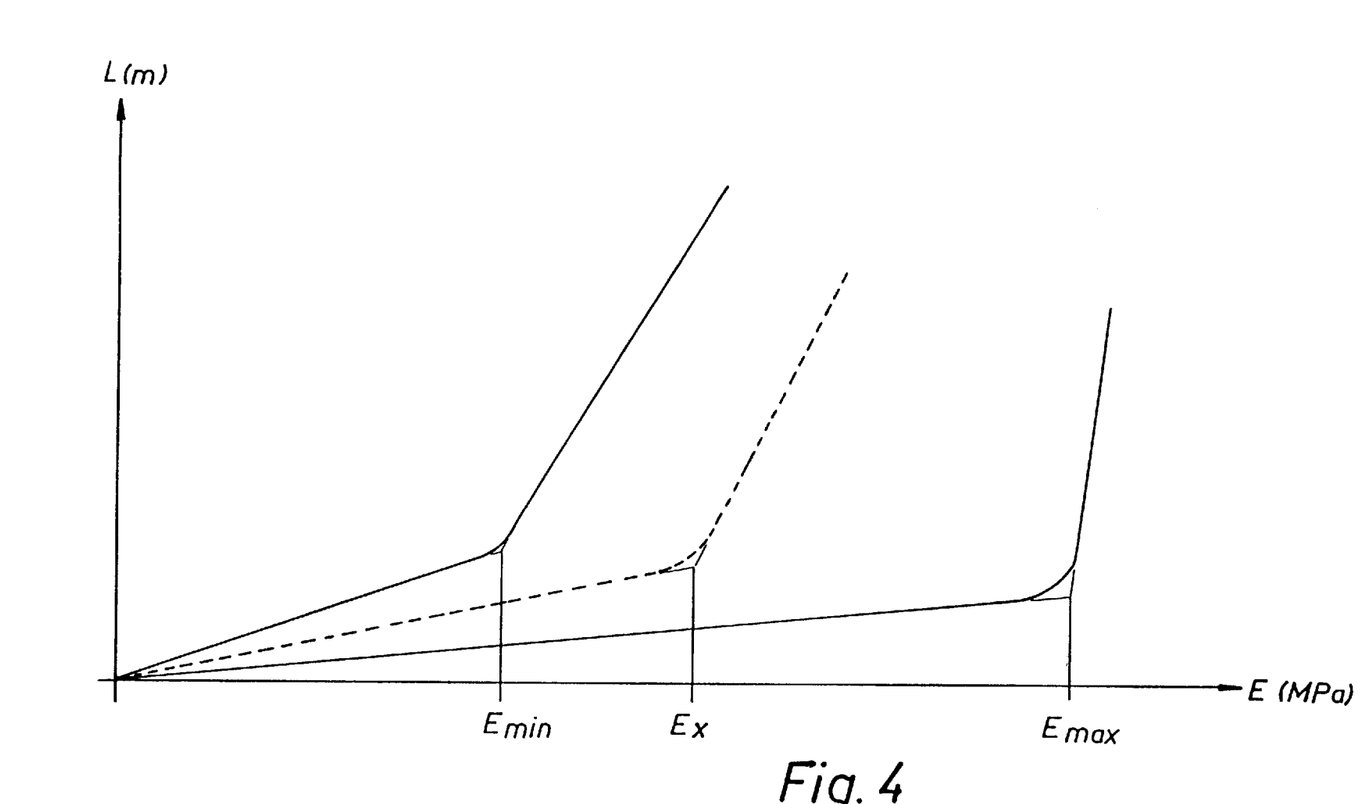
FIG. 4 illustrates an elongation versus elastic tensile strength graph and values needed for orientation degree calculations.

The "yield strength" method for orientation degree measurements establishes an elastic tensile strength value for the sample, expressed in force per sample cross-section area (E, MPa), by stretching the sample under recording of elongation (L, m), force and cross-section. A typical specimen will first. elongate elastically under rapid increase of applied force, then elongate with plastic deformation under slower increase of applied force. The force at the "knee" formed between these phases is taken as the maximum elastic strength of the sample when expressed in relation to its cross-section at that point. The value is determined for the oriented sample under study (Ex) as well as for the same material unoriented (Emin) and fully oriented (Emax) and the orientation degree is given by (Ex-Emin)/(Emax-Emin) *100. FIG. 4 illustrates typical graphs of L versus E and extraction of abovesaid values. This method is simple but requires access to an isolated sample of the tested material and of its unoriented and fully oriented counterparts.

The "IR-spectrometry" method for orientation degree determination measures absorption of polarized IR-radiation on one or several sample molecular vibration frequencies affected by orientation and gives strong absorption with the polarizing plane parallel to the vibration and weak absorption in the perpendicular plane. Absorbance (A, dimensionless) is normally determined with the polarization direction of the radiation parallel and orthogonal to the stretch axis for the sample and a dichroism ratio (D, dimensionless) is determined as the ratio between these absorbancies. An orientation factor (f, dimensionless) can be calculated, varying between 0 and 1 for none to full orientation along the selected axis. This value is used herein in percentage form for orientation degrees along the stretch axis. The method may give absolute orientation degree measurements, normally used in conjunction with FTIR (Fourier Transform Infrared Spectroscopy), and is described e. g. in Encyclopedia of Polymer Science and Engineering, edition 1988, volume 14, pages 542(564)–576, by H F Mark et al.

THE FUSE TUBE GENERALLY

Although the tube of the present invention may have utility for other purposes than described, it is preferred to use it in connection with the low energy fuse type referred to in the introduction and in the patents cited. It is a characteristic of such a fuse that the tube is a narrow plastic tube and still able to confine the shock in its interior with maintained structural integrity.

The outer diameter of the tube may be between 1 and 10 mm and typically between 2 and 5 mm. The inner diameter may be between 0.2 and 4 mm and especially between 0.5 and 3 mm. Commercial products tend to have an outer diameter around 3 mm and an inner diameter around 1 mm. The tube may have any cross-sectional shape but is preferably circular.

The reactive material can be self-explosive compounds, such as PETN, RDX, HMX etc., optionally with some additive for improved initiability such s aluminum. Signal speed with this kind of materials generally lies between 1000 and 3000 m/sec. The reactive material can also be a pyrotechnical mixture of fuel and oxidizer components, normally generating little gas during reaction therefrom. Mixtures of this kind, mainly intended to retard signal speed for delay purposes, are described for example in U.S. Pat. Nos. 4,660,474, 4,756,250 and 4,838,165 and in European patent specification 384 630 and PCT specification 87/03954. Signal speed may be between about 500 an 1500 m/sec. The reactive materials are generally pulverulent with a particle size between about 1 and 100 micrometers, in particular between 5 and 50 micrometers. The material is preferably adhered to the channel wall as described but may also be attached to a bearer in the channel as in the cited U.S. Pat. No. 3,590,739 or introduced in fiber form as in U.S. Pat. No. 4,290,366.

The necessary amount of reactive material in the channel is kept as low as possible for stable reaction at the desired speed without disrupting the tube. The absolute amount depends on the nature of the reactive material as well as the size of the tube. As a non-limiting example, for the commercial type product with a self-explosive material, the amount may be be between 1 and 100 mg/m or preferably between 5 and 50 mg/m.

The tube of the invention can have these or similar characteristics. It shall comprise at least two layers, a first layer closer to the channel and a second layer outside the first layer. It is preferred that the two layers consist of different materials as will be explained. Each of the described layers of the tube can internally be divided in several different layers, with discrete or continously varying properties. The tube may include reinforcing fibres but prefereably such fibres are omitted as superfluous or even detrimental to desired axial resilience.

THE FIRST LAYER

The main polymer of the plastic in the first layer shall have a limited orientation degree to meet the abovesaid objectives. In some instances the orientation degree may be higher than that in the second layer, for example if a certain stretching of the first layer has to be done for process reasons in an overextrusion process before final cold-stretching. The orientation degree should then be kept less than 10% more than that of the second layer. Otherwise the upper limitation on the orientation degree for the first layer is that it shall not be higher than the orientation degree of the second layer (to be specified hereinafter). Preferably the orientation degree is lower and most preferably substantially lower, especially at higher orientation degrees in the second layer. In absolute terms the orientation degree can be below 35%, preferably below 25% and more preferably below 15%. It is preferred that the inner layer has a minimum amount of axial orientation, e. g. an orientation degree exceeding 5% and also exceeding 10%.

General methods for securing a low orientation in the first layer may be to have a higher absolute temperature in the first layer than in the second layer during cold-stretching, to have a higher relative temperature by using a polymer having lower softening or melt temperature than the polymer of the second layer, by using a less orientable polymer, e.g. more branched or of less density, than the polymer of the second layer.

The first layer is preferably the innermost layer and should preferably have suitable powder adhesion properties as described. The adhesion mechanism can be of different nature, such as pure tack or electrostatic attraction. A preferred way is to use a polymer containing polar functional groups giving dipolar attraction with maintained good strength properties of the polymer. A preferred polymer type is ionomers such as Surlyn and Primacore (registered trade marks). Further suggestions for polar type polymers are given in the abovesaid European specification 327 219.

In case the limited orientation degree of the first layer is due to a lower orientability of that polymer, polymers can be selected having branched structure and a lower density, such as between 850 and 950 or between 880 and 925 kg/cu.m. for polyethylenes and corresponding densities for other polymers.

THE SECOND LAYER

The second layer adds to tube axial strength and should have a notable orientation degree, such as above 20%, preferably above 30% and more preferably above 40%. The maximum orientation degree can be up to 90% in case the second layer is not solely reponsible for tube external brittleness, for example if a further layer is arranged on the second layer. Otherwise, and for best overall properties, the orientation degree should be limited to less than 80% or even 70%. This means that the second layer will have an intermediate orientation degree when compared to products drawn to maximum tensile strength.

The material for second layer shall be selected from draw orientable polymers with significant durability and strength. Linear polymers are to be preferred, such as fibre forming polymers. Any density type can be used although it is preferred to select polymers corresponding to polyethylenes in between of LDPE and HDPE, such as LLDPE, LMDPE etc. Metric densities can be between 900 and 1000 and especially between 925 and 975 kg/cu.m. Corresponding polymers of other monomers than ethylene can be used, such as propylene or copolymers therebetween. Non-olefinic polymers are also usable such as polyamides or polyesters. Further suggestions are given in the abovesaid European specification 327 219.

Concentration of orientation to the second layer can be facilitated by selecting the more easily draw orientable polymers. Another approach is to select a polymer with high softening temperature. The temperature should then be higher than the softening temperature for the polymers of the first layer. A suitable softening temperature could be above 100° C. and preferably above 120° C.

The second layer can be the outermost part of the tube but it is also possible and sometimes preferable that the tube comprises further layers.

FURTHER LAYERS

The tube may have further layers than the first and second layers. Additional layers can be used predominantly to add secondary properties to the tube or can be part of the structural strength properties of the tube.

An additional innermost layer can be used to give the channel surface powder adhesive properties, although it is preferred that the first layer fullfils this function. Such an additional layer should be kept thin, e.g. below 0.4 mm and preferably below 0.2 mm and most preferably below 0.1 mm in thickness.

An additional outermost layer can be used for example as a barrier for moisture or oils or to make the tube surface smooth, soft or colored.

A preferred additional layer for structural strength purposes is to provide a plastic third layer outside the second layer. Similar to the first layer, the third layer preferably has a limited orientation degree, not exceeding 10% more than the second layer, preferably having a less orientation degree than the second layer and more preferably low orientation degree, not exceeding 35%, and preferably not exceeding 25%. Some orientation is desirable in the third layer, e.g. above 5% and preferably above 10%.

The material may be a draw orientable polymer of the second layer type. Other alternatives are EVA, EAA polyamides etc. To avoid too high orientation degrees in the third layer, less orientable plastics could be selected. Alternatively, or in addition, the polymer selected could have a lower softenining temperature than the polymer of the second layer.

THE FINAL TUBE

The size relationship between the layers can vary depending on the number of layers involved and the relative strength of the materails involved and their given orientation degrees within the general limits of the invention. In general terms the second layer provides axial strength, due to the stretch orientation, and also provides a significant contribution to radial strength, due to the applied limitations on said orientation. The first layer provides radial strength but above all prevents initiation of cracks or notch weakness failures in the critical inner parts of the tube.

Based on this division of contributions, the first layer size can be kept small, e.g. less than 50% and preferably less than 35% of tube wall cross-section area but exceeds 10% and preferably 15% of said area. In absolute terms the first layer wall thickness can be below 0.4 mm and preferably below 0.3 mm but exceeds 0.1 mm and preferably exceeds 0.2 mm.

The remaining part of the wall size should be made up of the second layer in case of two-layer tubes, disregarding here any thin additional layer for secondary purposes. In case an outermost third layer is provided for structural strength purposes, such a layer preferably contributes considerably to radial strength. The second layer could then be reduced in size, e.g. to between 20% and 60% and preferably between 30% and 50% of tube wall area and the third layer could also be given a size within these limits. The orientation degree in the second layer could then also be increased, as specified, to make a greater contribution to axial strength and less to radial.

Overall strength of the tube should exceed 25 MPa, preferably exceeds 40 MPa and most preferably exceeds 50 MPa.

Due to stretching and orientation the final tube is inclined to shrink under relaxation. Under ambient and operational temperatures the shrinking is limited due to the equalizing influence of the interfering layers and effected stress relaxation, typically below 5% an preferably below 3%. Heat shrinking, though, may exceed 3% and also exceed 5% in length.

THE EXTRUSION OPERATIONS

The manufacturing method should avoid a high degree of orientation in the first layer and concentrate orientation to the second layer. Since the suggested way of orienting the second layer polymer is to cold-stretch the first and second layers together, a first requirement on the manufacturing method is to secure a low degree of orientation in the first layer of the combined first and second layer tube, before the cold-stretching step. Generally this means that any kind of cold-stretching of the first layer should be avoided before the second layer is applied. In some manufacturing methods, like in overextrusion, some elongation of the first layer is unavoidable, so the method should allow for a limited degree of orientation in the first layer, before cold-stretching, say below 20% and preferably below 10%. In other methods, like co-extrusion, virtually no orientation needs to be introduced in the layer forming steps.

Although the reactive material can be introduced in a ready tube channel, at any point between formation of the consolidated inner tube and the final tube, by for example blowing or sucking a pulverulent material or feeding a liquid with the reactive material through discrete length of tube, it is generally preferred to introduce the reactive mateial continuously during formation of the inner layer or layers of the tube. This can be done by feeding and dispensing the reactive material through a channel or nozzle in the extrusion head for the inner layer, arranged centrally in relation to the annular die opening for the extrudate. Normally this means that the material is introduced essentially simultaneously with the formation of the inner layer.

Over-extrusion or tandem extrusion starts with the extrusion of the first layer in tube form followed by at least some cooling to solidification before the second layer is applied in a second extrusion step. As said, some elongation may inevitably be required during feeding of the first layer tube through the overextruder head but otherwise no orienting by stretching should take place, neither before nor during overextrusion. This does not exclude warm or melt stretching of the inner layer but it is preferred to extrude the melt in a larger than the desired cross-section and draw the melt down before solidification. A preferred draw-down degree, expressed as diameter ratio, may be between 2 and 10 times and preferably beween 3 and 5 times. Consolidation may require cooling below the solidification temperature of the plastic material. In order to limit orientation of the layer, in this and the following steps, it is desirable to maintain a relatively high temperature of the layer. Preferably the first layer tube is not cooled to less than 25° C., and preferably not less than 15° C., below its solidification temperture before overextrusion. Temperature adaption may require a cooling step, e.g. in a tandem process, or a heating step, e.g. in an overextrusion process.

The overextrusion step in the second extruder head is not highly critical. Draw down of the melt may take place as in the first step. If the tube shall comprise a third layer as described, it is preferred to co-extrude it simultaneous with the second layer although it is certainly possible to apply the third layer in a separate overextrusion step following the second layer extrusion, with optional cooling or heating steps in between. The third layer will be stretched together with the other layers and a desired limitation of orientation degree in this layer may be accomplished by any of the general methods described. Generally the two step extrusion processes give good temperature control over the layers in the production process.

Co-extrusion of first and second layers substantially simultaneously, for example from different nozzles in the same die head, is a simple method also resulting in a low initial orientation degree in the first layer when compared to the second layer and any orientation introduced during or after this step will affect both layers and not only the first layer. A melt draw down ratio may preferably be used as described before. If a third layer is to be applied, it can preferably be done essentially simultaneously, e.g in the same extrusion head to give a triple-extrusion step, although it is also possible to arrange a separate extrusion step after the coextrusion step, with optional cooling or heating steps in between. Here again the third layer will be stretched together with the first and second layers and orientation can be limited with the same general actions.

Further layers may also be applied after the cold-stretching step. This in particular for layers intended for secondary properties but also layers for structural purposes. A third layer provided in this way may for example be given a very low degree of orientation.

THE STRETCH OPERATION

As indicated some degree of orientation may result from stretching during the extrusion operations and thereafter. It is preferred, however, that most of the cold-stretching is made under controlled conditions in a separate stretching zone. Such a zone may include at least two gripping means for the tube, e.g. opposed endless belts or capstan wheels, the second gripping means being driven with higher speed than the first, thereby elongating the tube in a controlled manner.

The tube must have a certain rigidity to sustain forces from the gripping means without deformation and accordingly should have a temperature well below its softening temperature when passing the gripping means, such as below 50° C. or even below 40° C., subject to the nature of the plastics employed. A cooling step may be required before the first gripping means and also before the second gripping means, especially if the stretch zone in a preferred manner includes a heating zone.

In general terms a draw orientable polymer under elongation tend to roughly maintain its axial tensile strength in spite of the decreasing cross-section. When reaching a maximum degree of orientation further elongation tends to break the material. According to the invention the second layer shall be given an intermediate degree of orientation, i.e. a significant orientation although well below the maximum possible. The stretch ratio for this purpose depends on the polymer used and the stretch conditions employed. Roughly the stretch ratio should exceed 1.5 and preferably exceeds 2 but could be kept under 5 and preferably also under 4.

Draw orientable polymers also tend to elongate at a well defined and localized "neck-in" point on the drawn material, which usually causes no probelms, especially not at high elongation ratios. At intermediate stretch ratios, however, the neck-in point may fluctuate both in position and shape and if so it is preferred to stabilize the process by smoothing out or extending the neck-in point, e.g. to more than 10 cm and preferably to more than 25 cm of the steep part of the neck.

It is preferred to include a heating step in the stretch zone for the abovesaid purpose and for obtaining a uniform orientation structure. Good results have been obtained by raising tube temperature to between the amorphous and crystalline melting points for the second layer polymer or generally to a temperature between 5° and 25° C. below the second layer plastic softening point.

It is further preferred to use an axially extended heating zone and to use surface heating, for example in an oven or heating bath.

A single step stretching operation is suitable and most convenient although it is possible that several streching steps as described are used.

Abovesaid conditions are selected to give orientation primarily in the second layer. Less orientation in the first layer may be accomplished by using a first layer polymer having a lower melt temperature than that of the polymer in the second layer. For lowest orientation of the first layer stretching should be conducted above the softening temperature for the first layer but below the softening temperature for the second layer, although improvements have been experienced also at elevated tempertures slightly below the softening point for the first layer. Another approach, useful also at small differences in said softening temperatures, is to maintain a higher absolute temperature in the first layer and a lower absolute temperature in the second layer, for example by cooling the tube from the exterior side immediately before stretching. A less draw orientable polymer in the first layer than in the second layer also assists in reducing orientation in the first layer.

When the tube comprises a third layer it is preferred to have a lower orientation degree in that layer than in the second layer. The same principal methods as for the first layer can be used to reduce orientation degree in this layer. A higher absolute temperature in the third layer than in the second layer can be obtained for example by heating the tube from the exterior side immediately before stretching.

The stretch operation builds stresses into the tube, making the tube apt to relax. Molecular orientation is intentionally introduced and shall not be relaxed, although it may be unmasked as shrinking at a substantial temperature raise. To avoid shrinking at ambient or near ambient temperature, stress relaxation can be done with advantage before use of the tube, preferably at a slight temperature increase under low tension, which can be done in an idle loop in-line.

SUMMARY OF DRAWINGS

FIG. 3 shows in schematic form a preferred general process layout according to the invention for manufacture of two and three layer tubes.

DESCRIPTION OF DRAWINGS

Figure 1A:
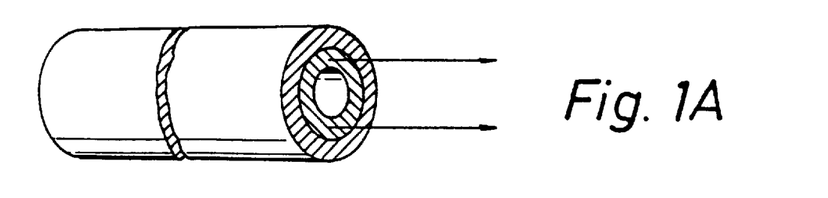
FIGS. 1A and 1B schematically show layer structure and orientation pattern of prior art fuse tubes with two and three layers respectively.
Figure 1B:
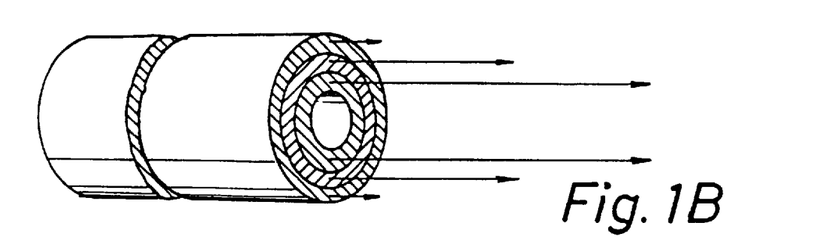

FIG. 1A illustrates a stretched two-layer tube of the prior art kind, in which an inner layer is first produced and overextruded under stretching in a second step. The arrows indicate the resulting general orientation pattern, showing significant orientation of the inner layer and substantially no orientation in the outer layer. FIG. 1B illustrates a prior art tube in which a two-layer tube of the kind shown in FIG. 1A is submitted to a further overextrusion step under elongation. The innermost layer has still a more pronounced orientation, the intermediate layer clearly less and the outermost layer substantially nil.

Figure 2A:
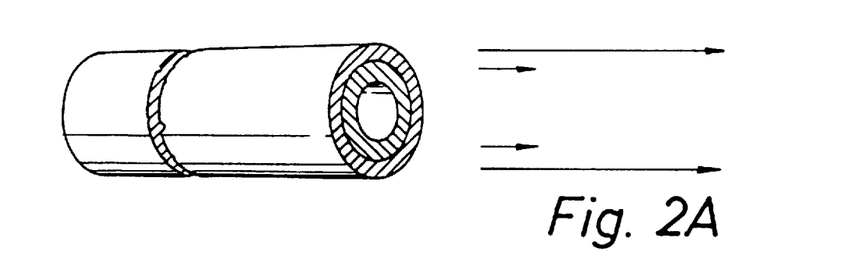
FIGS. 2A and 2B schematically show layer structure and orientation pattern of preferred fuse tubes with two and three layers respectively according to the invention.
Figure 2B:
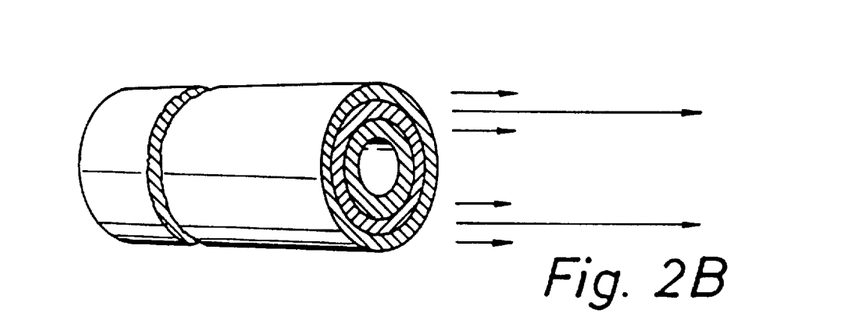

FIG. 2A illustrates the two-layer tube of the invention as described. Orientation is concentrated in the second, outer, layer while the first, inner, layer has substantially less orientation. FIG. 2B illustrates a three-layer tube of the invention, having inner layers corresponding to those shown in FIG. 2A and a third, outermost, layer with a low degree of orientation. It should be noted that the third layer can be provided without further increasing or affecting the orientation properties of the two inner layers, contrary to the prior art. In both embodiments of the invention the second layer provides axial strength, and non-brittle and shock-resistant properties are maintained in the first layer. Hereby the layers contribute optimally to desired fuse tube properties and the inherent strength capacities of the polymers are better utilized than in the prior art products.

Figure 3A:
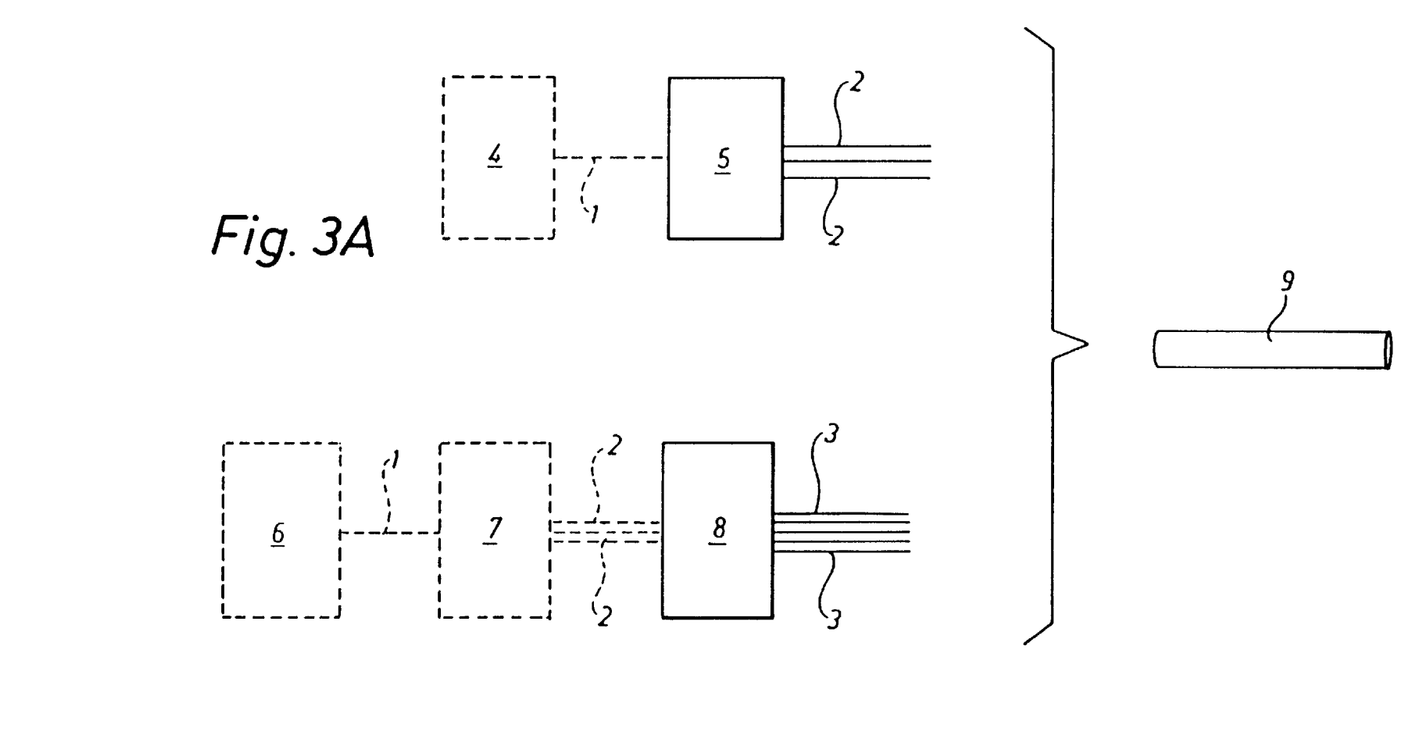
FIG. 3A relates to the extrusion operations and FIG. 3B relates to the stretching operation.

FIG. 3A illustrates schematically the extrusion process for two and three layer tubes respectively. The first, second and third lyers are shown at positions 1, 2 and 3 respectively. In the two layer process the first layer 1 may be extruded from a first extruder 4 and the second layer 2 may be applied in a second extruder 5. Extruder 4 is optional insofar as extruder 5 co-extrudes both the first layer 1 and the second layer 2 simultaneously. In the three layer process the layers 1, 2 and 3 may be extruded from three different extruders 6, 7, and 8. Both the extruders 6 and 7 are optional insofar as extruder 8 is a triple-extruder and one of them may be omitted if extruder 8 is a single or double layer overextruder. All optional extruders represent both in-line tandem and overextrusion processes and some form of cooling steps are normally required between extruders. The extrusion process results in a two or three layer tube 9 to be transferred to the subsequent stretch operation.

Figure 3B:
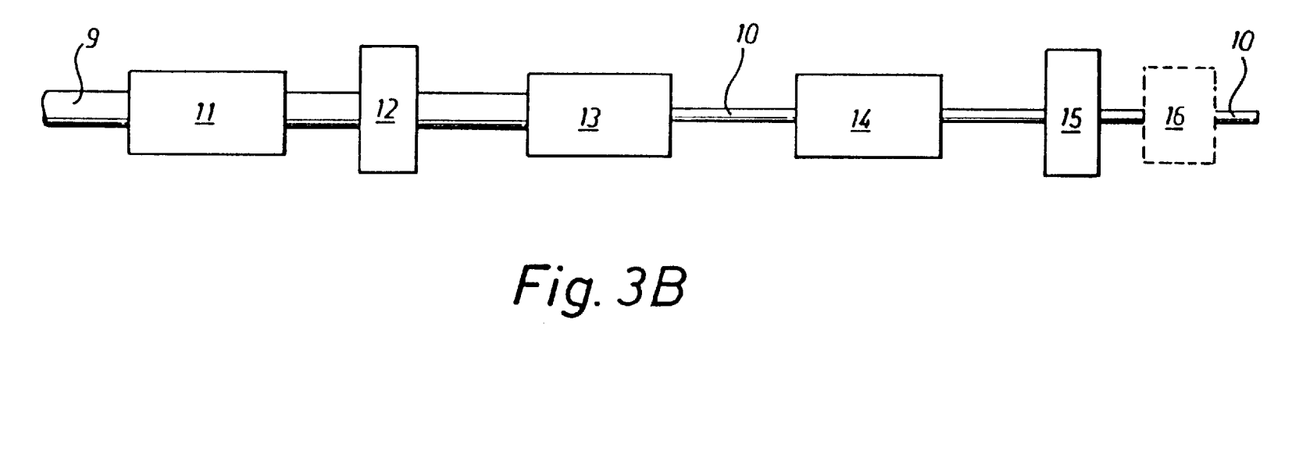

FIG. 3B illustrates the preferred stretch operation in which tube 9 from the extrusion operation is drawn to a narrower tube 10. The still hot tube from the extruders is cooled in a cooler 11 to a sufficiently low temperature to sustain the first gripping means of capstan type 12, representing the first end of a stretching zone ending with capstan 15, driven at higher speed than capstan 12. The tube is reheated in heater 13 of, for example, oven or hot bath type. The main part of tube stretching, imposed by the speed difference between capstans 12 and 15, takes place on the softened tube in this heater. The drawn tube 10 of reduced diameter is fed into a cooler 14 in which the temperature is reduced, at least to the degree required for passage of the second capstan 15. Stresses in the tube 10 may be released under viscoelastic shrinking in an optional relaxation step 16, in which the tube is allowed to loop under low tension and slightly elevated temperature.

The graph of FIG. 4 and its use for orientation degree calculations has been described in connection with the definition of "orientation degree", "yield strength" method, under the Definitions heading.

EXAMPLE 1

A reference two layer tube without cold-stretching was prepared with first innermost layer of Surlyn 8940 (Teg. Trade Mark of DuPont) and an outermost second layer of linear low density polyethylene (NCPE 8706, from Neste Polyethylene AB). The two layers were coextruded at 200° C. for the first layer material and at 210° C. for the second layer material from a common extrusion tool, fed with separate screws in about equal volume rates, into a common annular slit of 13.5 mm outer diameter and 6.5 mm inner diameter. The extruded melt was drawn down in melt condition to an outer diameter of 2.6 mm and was fed into a cooling manifold fed with cooling water of about 25° C. in which the tube was cold to about 40° C. before collected at a spool. The tube had a room temperature tensile strength at break of 105N. The fold test result was 382/400 (ruptures/number of folds).

EXAMPLE 2

A two layer tube was prepared as in Example 1 and with the same materials in the first and second layers extruded at the same volume rates from the same extrusion tool. Simultaneously reactive material of HMX/Al in a weight ratio of 92/8 and in an amount of about 36 mg/m was fed into the tube interior from a centrally arranged canula in the extrusion tool. The extruded tube was drawn down to 3.6 mm outer diameter in melted condition and was cooled in the same manner as in Example 1 to about the same temperature. The cooled tube was fed into a stretch zone between two capstans and initially heated for about 14 seconds in a water bath of 74° C. and cold-stretched in a stretch ratio of 2:1. The tube is again cooled to about 50° C. before passage of the second capstan. The so prepared tube was collected on spool. Tube room temperature tensile strength at break was 200N and fold test result 111/400.

The tubes of Examples 1 and 2 were intentionally given a thinner than required wall thickness to show a higher than normal failure rate in the fold test, in order to amplify differences present.

EXAMPLE 3

A three layer tube was manufactured, consisting of a first layer of Surlyn 8940, a second layer of a LMDPE (NCPE 1935, from Neste Polyethylene AB) and a third layer of LLDPE (NCPE 8706), the weight relation between the three layers being about 35/40/25 in the final tube. The first and second layers were co-extruded at 205° C. and 220° C. respectively from the same extruder tool as described in Example 1. The melt was drawn down to an outer diameter of 3.6 mm before cooling in a water bath of 15° C., giving a temperature of 40° C. on the exciting tube. The cooled tube was dried in a vacuum drier and further dried and heated in a hot air blower step, giving an approximative temperature of 45° to 50° C. The tube was fed in-line directly through an overextrusion step, wherein the third layer plastic was applied at about 210° C. The three layer tube was cooled and stretched as described in the previous examples at a temperature of 98° C. After cooling before the second capstan, the tube was stress relaxed for about 20 seconds in a low tension-loop accumulator at a temperture of about 100° C. provided by an infra heater. The tube was cooled, dried and collected at about ambient temperature. Tube tensile strength as above was 230N and the fold test result 0/400.

We claim:

1. A method for manufacture of a low energy fuse, comprising a plastic tube with a channel, the channel containing a reactive material able upon ignition to sustain a shock wave within the channel, the tube comprising at lease two layers of plastic materials, a first plastic layer closer to the channel and a second plastic layer outside the first layer, at least the second layer containing a major amount of draw orientable polymer resin, characterized in, that it comprises the steps of a) forming, by extrusion of the first layer plastic, the first layer in the form of a tube,
   b) introducing the reactive material in the tube channel,
   c) limiting stretching of the first layer to give a low degree of orientation, not exceeding 10%,
   d) forming, by extrusion of the second layer plastic, the second layer around the first tube, while the first layer has said low degree of orientation, and
   e) cold-stretching the first and second layers together to axially orient the polymer of the second layer to an orientation degree of more than 20% and less than 90% and to axially orient the polymer of the first layer to an orientation degree not exceeding 10% orientation degree units more than that of the second layer.

2. The method of claim 1, characterized in, that the stretch ratio in the cold-stretching step is between 1 and 5 times the original length.

3. The method of claim 2, characterized in, that the stretch ratio is between 2 and 4 times.

4. The method of claim 1, characterized in, that the stretching takes place in a stretch zone between movable gripping means for the tube, said gripping means being driven with different speeds.

5. The method of claim 4, characterized in, that the tube temperature at the gripping means is well below the softening temperature of the plastics in the first and second layers, preferably below 50° C.

6. The method of claim 4, characterized in, that the stretch zone includes a heating step.

7. The method of claim 6, characterized in, that the tube is heated to a temperature giving a neck-down area length above 10 cm.

8. The method of claim 6, characterized in, that the tube is heated to a temperature between the amorphous and the crystalline melting points for the second layer polymer.

9. The method of claim 6, characterized in, that the tube is heated to between 5 and 25° C. below the softening point of the second layer plastic.

10. The method of claim 6, characterized in, that the heating is conducted in an axially extended zone.

11. The method of claim 6, characterized in, that surface heating is used, e.g. in an oven or heat bath.

12. The method of claim 1, characterized in, that the stretching operation includes several stretching steps.

13. The method of claim 1, characterized in, that polymer orientation during cold-stretching is concentrated to the second layer.

14. The method of claim 13, characterized in, that a second layer polymer is selected having a higher melt temperature than the polymer of the first layer.

15. The method of claim 13, characterized in, that during stretching the average temperature of the second layer is lower than the average temperature of the first layer.

16. The method of claim 13, characterized in, that a second layer polymer is selected having a higher draw orientability than the first layer polymer.

17. The method of claim 1, characterized in, that after cold-stretching the tube is stress relaxed under low or no tension.

18. The method of claim 17, characterized in, that the relaxation is performed at elevated temperature.

19. The method of claim 1, characterized in, that a third plastic layer is formed around the second layer.

20. The method of claim 19, characterized in, that the third layer is applied on the second layer before the cold stretching step.

21. The method of claim 19, characterized in, that the third layer is applied on the second layer after the cold stretching step.

22. The method of claim 1, characterized in, that after forming the first layer in the form of a tube (step a), the tube is cooled below its solidification temperature before forming the second layer around the first tube (step d) by overextrusion or tandem extrusion.

23. The method of claim 22, characterized in, that the first layer is stretched less than 10% before or during the overextrusion.

24. The method of claim 22, characterized in, that the first layer is cooled to an average temperature not lower than 25° C. below its solidification temperature.

25. The method of claim 22, characterized in, that after cooling the first layer is reheated before applying the second layer (step d).

26. The method of claim 22, characterized in, that a third layer is formed by extrusion around the second layer.

27. The method of claim 26, characterized in, that the third layer is formed substantially simultaneous with the second layer.

28. The method of claim 26, characterized in, that the second layer is cooled before the third layer is formed around it in a separate step.

29. The method of claim 28, characterized in, that the cold-stretching takes place before forming the third layer.

30. The method of claim 28, characterized in, that the cold-stretching takes place after forming the third layer.

31. The method of claim 1, characterized in, that formation of the first layer (step a) takes place substantially simultaneous with the formation of the second layer (step d).

32. The method of claim 31, characterized in, that a third layer is formed by extrusion around the second layer.

33. The method of claim 32, characterized in, that the third layer is formed substantially simultaneous with the first and second layers.

34. The method of claim 32, characterized in that the second layer is cooled before the third layer is formed around it in a separate step.

35. The method of claim 34, characterized in, hat the cold-stretching takes place before forming the third layer.

36. The method of claim 34, characterized in, that the cold-stretching takes place after forming the third layer.

37. A fuse tube manufactured by the method of claim 1.

* * * * *